ZERO TEMPERATURE COEFFICIENT PIEZOELECTRIC CRYSTAL

Filed April 7, 1951 2 Sheets-Sheet 1

INVENTORS.
Virgil E. Bottom
Walter R. Ives, Jr.
BY Foorman L. Mueller
Atty.

April 24, 1956 V. E. BOTTOM ET AL 2,743,144

ZERO TEMPERATURE COEFFICIENT PIEZOELECTRIC CRYSTAL

Filed April 7, 1951 2 Sheets-Sheet 2

INVENTORS.
Virgil E. Bottom
Walter R. Ives, Jr.
BY Foorman L. Mueller
Atty

United States Patent Office 2,743,144

Patented Apr. 24, 1956

2,743,144

ZERO TEMPERATURE COEFFICIENT PIEZOELECTRIC CRYSTAL

Virgil E. Bottom, Fort Collins, Colo., and Walter R. Ives, Jr., Chicago, Ill., assignors to Motorola, Inc., Chicago, Ill., a corporation of Illinois Application April 7, 1951, Serial No. 219,862

6 Claims. (Cl. 310—9.5)

This invention relates generally to quartz crystal blanks for use in controlling the frequency of oscillating circuits, and more particularly to such blanks having a substantially constant frequency of vibration over a wide temperature range.

Piezoelectric crystals made from quartz and other crystal materials have been used for a relatively long time for controlling the frequency of oscillating circuits. It has been found necessary to provide such crystals in all circuits which must be maintained within very close frequency limits. However, the frequency characteristics of known crystals vary with temperature so that the resulting frequency of the circuit varies with the temperature of the crystal to cause a change in the operating frequency. Various attempts have been made to provide crystals having zero temperature coefficient, and crystals have been provided having substantially zero temperature characteristics over certain temperature ranges. Such crystals have not, however, had a sufficiently low temperature coefficient over sufficient range for use in mobile applications or other applications wherein the equipment is subject to relatively wide temperature changes. The most commonly used crystal having substantially zero temperature coefficients has been designated the AT type crystal. These crystals have a very small temperature coefficient over a range from about zero to 70° C. In many applications, however, the temperature goes above 70° C. and the frequency of such crystals above this point changes quite rapidly to cause undesired changes in the oscillator frequency.

In order to stabilize the frequency of crystal controlled oscillators, in many cases the crystals have been placed in ovens which have heaters therein and thermostatically controlled circuits so that the temperature of the oven is maintained at a specified value. This arrangement has provided very satisfactory operations, but, of course, requires energy for maintaining the oven at the desired temperature and requires additional equipment. Even when using a heated oven there will be some changes in temperature of the crystal and it is therefore necessary to operate the crystal within the range at which the temperature coefficient thereof is substantially zero. When using the AT crystal for example, it would then be necessary to operate the heater at a temperature between zero and 70° C. It will be apparent that when the temperature exceeds 70°, which is the case in many instances, the heater will not operate to hold the crystal in the zero temperature coefficient range, and the crystal will be carried above the zero temperature range so that the frequency will shift. It is therefore seen that the heater cannot correct for variations in temperature which exceed the maximum temperature of the zero temperature coefficient range.

It is therefore an object of the present invention to provide an improved crystal blank having a substantially zero temperature coefficient over a wide range.

A further object of this invention is to provide a crystal blank having a zero temperature coefficient over a range extending to a relatively high temperature which is above the highest temperature in the space where the crystal will be used.

A further object of this invention is to provide a zero temperature coefficient crystal blank which can be easily oriented in the natural crystal and which has relatively high activity at very high frequencies so that it can be used for controlling oscillators operating at very high frequencies.

A feature of this invention is the provision of a quartz crystal blank which operates in a shear mode at very high frequencies and which has a substantially zero temperature coefficient over a temperature range from 30° to 110° C.

Another feature of this invention is the provision of a crystal plate having a zero temperature coefficient over a wide temperature range, which is cut from a native quartz crystal with the plane of the major faces thereof being inclined with respect to both the electrical axis and the optical or polarizing direction through the quartz crystal.

A further feature of this invention is the provision of a quartz crystal vibratory plate cut from a quartz crystal with the normal to the major faces thereof extending at an angle of approximately 71° from a positive X axis and at an angle of approximately 56° from the Z direction.

A still further feature of this invention is the provision of a zero temperature coefficient crystal which is cut at an angle with respect to both the X and Z axes of the crystal, but which is in a plane differing only slightly from an atomic plane through the crystal.

Further objects and features and the attending advantages of the invention will be apparent from a consideration of the following description when taken in connection with the accompanying drawings in which.

In practicing the invention a crystal blank is cut from a quartz crystal for use as a shear mode vibratory body at a high frequency in the range from one to eight megacycles. The crystal blank is cut from the crystal body at an angle which provides a substantially zero temperature coefficient over a wide frequency range. It has been found that a crystal cut with the normal to the major faces thereof extending at an angle of the order of 71° from a positive X axis and at an angle of approximately 56° from the Z or optical direction through the crystal has a substantially zero temperature coefficient through the range from 30° to 110° C. This plane is relatively easy to identify in the crystal since it is very close to the $\bar{1}\bar{2}32$ atomic plane of the crystal. The activity of a crystal blank taken from this section, although not as great as that of certain other blanks which may be cut from such a crystal, is sufficient for use in most oscillator circuits. The decrease of activity is compensated for by the fact that the activity is substantially constant over the frequency range and the spurious modes of vibration are minimized.

Figures 1, 2, 3, 4:
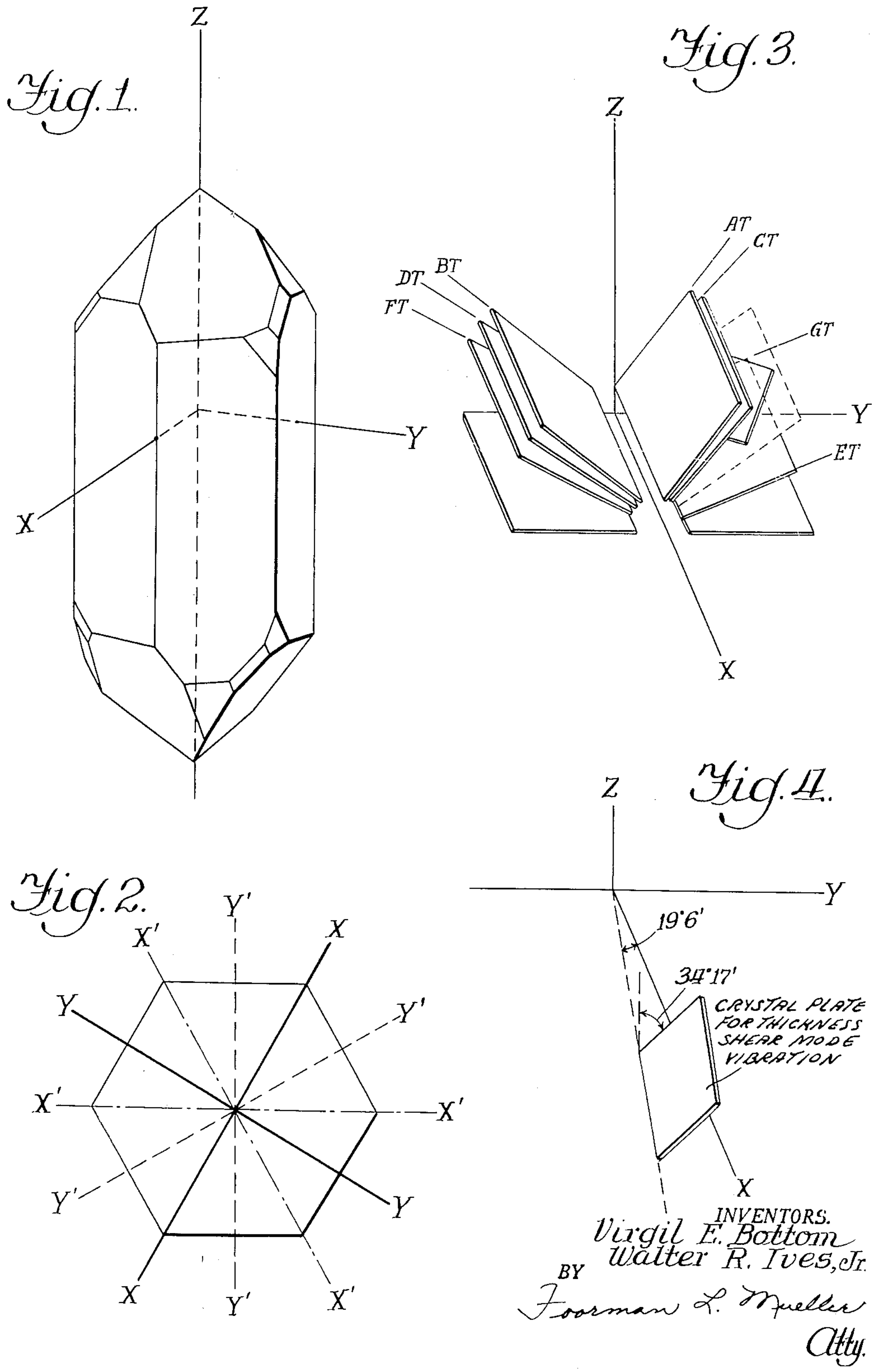
Fig. 1 illustrates a natural quartz crystal with the crystallographic axes thereof indicated.
Fig. 2 is a cross section view of the crystal of Fig. 1 illustrating the electrical and mechanical axes.
Fig. 3 illustrates the orientation of a plurality of known crystal blanks having substantially zero temperature coefficients.
Fig. 4 illustrates the orientation of a crystal blank in accordance with the invention.

Referring now to the drawings, in Fig. 1 there is illustrated a quartz crystal of the right hand type with the Z axis extending vertically, the Y axis extending out through a face of the crystal to the right and the X axis extending from an edge of the crystal to the left. The Z axis, which is the optic axis, is not in a true sense an axis but a direction, since the same optical effect (polarization) is produced along all the paths through the crystal parallel to the Z axis, or in other words, for all light passing in the direction of the Z axis. As a quartz crystal is of the trigonal type having threefold symmetry, instead of having a single mechanical (Y) axis and a single electrical (X) axis, it actually has three mechanical and electrical axes. These axes are also directions, with electrical or X axes extending through the crystal in a direction parallel to a line through opposite edges thereof. This is shown best in Fig. 2 in which one X axis is shown in solid lines and the other two axes which are designated X are shown by light dot-dash lines. For each X axis there is a mechanical or Y axis which is perpendicular to the X axis, and which passes through the crystal perpendicular to the main faces thereof. The mechanical or Y axes are also shown in Fig. 2, with the axes associated with the X' axes being indicated Y' and shown by lighter dotted lines.

In the following description, a right hand quartz crystal as illustrated in Fig. 1 will be considered. The definitions used herein are those established in the text entitled "Piezoelectricity" by Walter Guyton Cady, McGraw-Hill Book Company, Inc., 1946 (first edition, second impression), and particularly as defined in chapter II, section 11, pages 26 and 27. Left hand quartz crystals have exactly the same characteristics provided the symmetry is reversed. The X or electrical axes have polarity characteristics and are designated plus or minus depending upon the polarity of the charge produced on compression and extension of the quartz. For right quartz the positive axis is the one which produces a positive charge on compression and a negative charge on extension, and for left quartz the positive axis is the one which produces a negative charge on compression and a positive charge on extension. Hereinafter in the specification and claims when a positive X axis is referred to, the above definitions will apply. In Fig. 1 the X axis shown is a negative X axis.

It has been found that by cutting crystals in different manners various different modes of operation can be produced which may have different temperature characteristics depending upon the particular cuts. For high frequency use, the AT cut has been most commonly used, which is a cut taken with one edge thereof parallel to the X axis and with the plane thereof rotated about the edge so that the blank is inclined with respect to the Z axis or direction. This is illustrated in Fig. 3. Fig. 3 also indicates the position of the BT, CT, DT, ET, FT and GT cuts, all of which have been found desirable in certain applications and all of which have zero temperature coefficient through certain frequency ranges. It will be noted that all of these blanks have edges extending parallel to the X axis and are inclined only with respect to the Z axis. Fig. 3 also illustrates a right hand quartz with the X axis being negative.

As previously stated, the AT cut crystal has been most commonly used for high frequency applications. This crystal operates in a shear mode vibration at relatively high frequencies and has been found to have a substantially zero temperature coefficient over the temperature range from 0 to 70° C. This crystal has the disadvantage that other modes of vibration are coupled to the shear mode and these spurious modes are apt to cause serious activity dips. That is, the activity of the crystal varies over the temperature range. Further, crystals for high frequency operation are very thin so that the upper practical limit has been of the order of 8 megacycles. The BT crystals, although having a greater thickness for the same frequency and therefore being suitable for use at higher frequencies, is not as strongly driven as the AT crystal and has a smaller temperature range through which the temperature coefficient is substantially zero. The other crystal cuts referred to above also have very short ranges over which the temperature coefficient is substantially zero and for this reason have not been widely used.

Although it has been proposed to cut crystal blanks through planes rotated about both the X and Z axes, such crystals have been of theoretical interest only and have not been used commercially. The reasons for this is, first, these crystals have not been found to have characteristics more desirable than available crystals such as the AT crystals, and second, it is very difficult to locate the desired planes and the manufacture of the crystal was therefore rendered very difficult. Also, calculations as to the location of the zero temperature planes are complicated by the fact that these calculations must take into consideration modes of vibration other than the mode to be utilized in the operation of the crystal.

It is possible, however, to make relatively accurate cuts through quartz crystals, which may be inclined with respect to both the X and Z axes of the crystal, when such cuts are close to an atomic plane within the crystals. These planes are physical planes formed within the crystal due to the orientation of the atoms therein and they can be detected by various techniques such as the use of X-rays. Therefore cuts through the atomic planes or through planes having inclination with respect to the crystallographic axes differing from the inclination of the atomic planes by angles of 5 degrees or less may be relatively easily produced. Consideration has therefore been given to the use of crystal blanks extending in planes rotated about two axes, but which are very close to the atomic planes in the crystal.

It has been found that by orienting the blanks in such a way that none of the crystallographic axes lies in the plane of the blanks, crystals can be provided which have a substantially zero temperature coefficient through a wider range of temperatures which extends higher than that of the AT cut previously referred to. This crystal cut has been designated the IT cut. This crystal blank is illustrated in Fig. 4, which shows the relative position of the blank with respect to the other zero temperature coefficient blanks shown in Fig. 3.

Fig. 4 like Fig. 3 illustrates a right hand quartz and the X axis shown is negative. Although a blank of rectangular configuration is shown in Fig. 4, the blank may be of any desired configuration. Blanks cut in this manner, in addition to having the more desirable temperature frequency characteristics, have the further advantage that the activity of the crystal is substantially constant over the wide temperature range in which the frequency is constant. Also, such crystals are substantially free from spurious responses since the undesired modes are much weaker and are not strongly coupled to the desired modes. Although the activity is somewhat less than for AT crystals, the fact that the activity is constant and spurious responses are reduced compensates to a large extent for the decreased activity. The IT crystal cut, in accordance with the invention, has the further advantage that the frequency is higher for a given crystal thickness so that crystals for very high frequency operation can be provided by using crystals having thicknesses which are of such dimensions that can be easily calibrated and cut.

Figures 5, 6, 7:
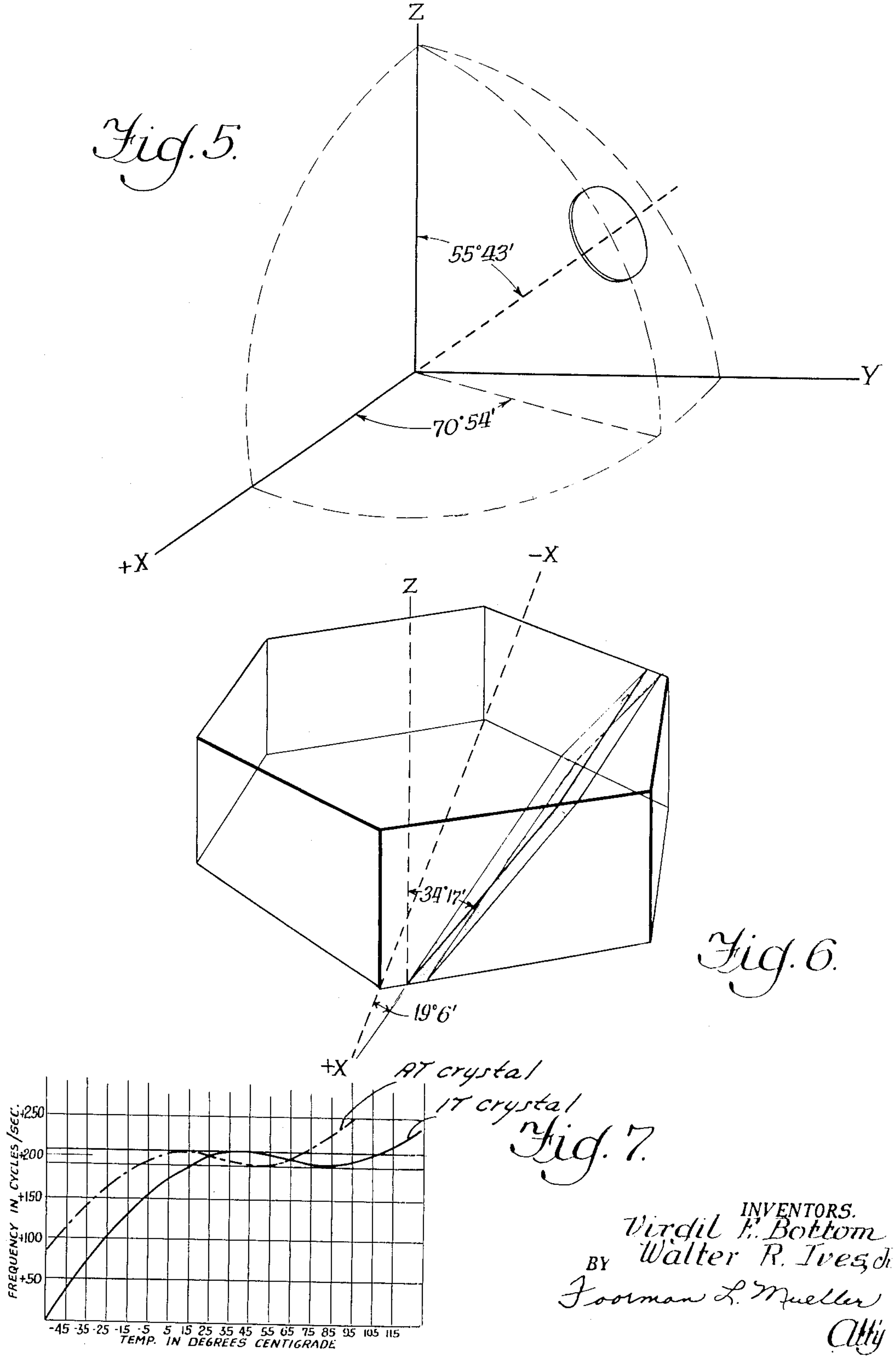
Fig. 5 illustrates in a different manner, the orientation of a crystal blank in accordance with the invention.
Fig. 6 illustrates pictorially the crystal blank in accordance with the invention as a portion of a slab cut perpendicular to the Z axis of a quartz crystal.
Fig. 7 includes curves showing the temperature-frequency characteristics of the crystal in accordance with the invention by a solid line and showing the characteristics of an AT crystal by a dot-dash line.

In Fig. 5 the position of the blank is illustrated by a system of orientation which is commonly used and which is believed to designate more specifically the actual location of the crystal blank in accordance with the invention. Fig. 5 also shows a right hand quartz and the X axis illustrated is positive as indicated on the drawing. In accordance with this system the blank is defined by the angle of the normal extending therefrom with respect to the X and Z axes. As the normal to the blank is at right angles to the plane of the blank, the angles of the normal with respect to the crystallographich axes are the 90° complements of the angles of the blank itself with respect to the axes. Under this system of designation, which will be used hereinafter since it is believed to be more generally recognized and to avoid confusion, the IT crystal blank in accordance with the invention has a normal thereto inclined at an angle of 55° and 43′ from the Z axis, and with the projection thereof on the XY plane being at an angle of 70° and 54′ from the positive X axis. As the $\bar{1}\bar{2}32$ atomic plane, which is one of the stronger atomic planes through the quartz crystal, has a normal at an angle of 59° and 14′ from the Z axis and with the projection of the normal at an angle of 70° and 54′ from the X axis, it is obvious that a crystal as illustrated in Fig. 5 may be easily identified in the natural crystal. Since the angle from the X axis is the same as that of the atomic plane, it is merely necessary to establish the atomic plane and then provide the cut by shifting the inclination with respect to the Z axis slightly, which may be accomplished relatively easily. The crystal blank in Fig. 5 is shown circular, but here again it is to be noted that the crystal may be of any desired configuration.

In Fig. 6 there is illustrated pictorially the position of the crystal blank in accordance with the invention with respect to a section of a quartz crystal. The quartz crystal illustrated in Fig. 6 is a left hand crystal with the X axis being positive at the bottom and negative at the top as shown in the drawing. The figure could be used to illustrate a right hand quartz crystal by reversing the polarity of the X axis. The crystal section shown in Fig. 6 is a section taken perpendicular to the Z axis through the crystal of Fig. 1. It is seen that the plane of the crystal is rotated through an angle of 19° and 6′ with respect to the X axis, with the rotation being clockwise away from the positive end of the X axis. The plane is then rotated about the bottom edge until the major faces thereof are at an angle of 34° and 17′ from the Z or vertical direction through the crystal section. This illustrates in a pictorial manner the actual section from the quartz crystal which is cut to provide the blank in accordance with the invention.

In Fig. 7 there is illustrated the frequency temperature curve of the IT crystal in accordance with the invention and also the frequency-temperature curve of an AT crystal such as is generally available. The curves illustrated were obtained when using crystals for operation at five megacycles, with the scale on the right indicating the frequency deviation in cycles. The blanks used were round and were contoured in accordance with established principles to reduce the spurious responses thereof. It is apparent from these curves that the range in which the frequency variation is within the limits plus or minus .00025% is from 30° to 110° C. for the IT crystal as indicated in the solid line, and the corresponding frequency range for the AT crystal indicated by the dot-dash line is from 0° to 70° C.

The curve for the IT crystal shown in Fig. 7 is for a blank cut with the normal thereto extending at an angle of 55° 43′ with respect to the Z axis and with the projection thereof on the XY plane at an angle of 70° 54′ with respect to the X axis. By using a slightly smaller inclination with respect to the Z axis, such as 55° 41′, the range may be extended from the order of zero to 135° C., but the frequency over this range will deviate more from the center value. By shifting to a higher angle, such as 55° 45′ the range is reduced somewhat but the curve is extremely flat to provide very accurate characteristics over the more limited range. It is to be pointed out that slight errors are involved in locating the atomic planes and in locating the cut with respect to the planes so that variations of 1 to 2 minutes may be possible from the above values.

Operation of the IT crystal at harmonic modes to thereby provide control of high frequency oscillators has been found to be satisfactory. Operation at such modes changes to a slight extent the temperature characteristics and it may be desirable to increase the angle of inclination with respect to the Z axis by a small amount. Therefore a blank having a normal extending at an angle slightly more than 55° 43′ with respect to the Z direction may be optimum for third harmonic operation. It will be noted, however, that the variations in the Z angle are all very slight and it is believed that a range of 55° 40′ to 55° 50′ will take care of all practical applications for either fundamental or harmonic mode operation.

As many items of equipment containing crystals have been designed to be placed in more compact housings, the operating temperature of the equipment within the housing becomes higher. That is, less space is provided for dissipation of a fixed amount of heat so that the components within the housings may operate at very high temperatures, especially when the ambient temperature in the vicinity of the housing is high. This has contributed to the need for crystals having a zero temperature range extending above the upper 70° limit of the AT crystal. The IT crystal which operates with a very small temperature coefficient up to 110° satisfactorily meets the desired upper limit. As the equipment when operating will assume a temperature of 30° C. after a short interval of time, it may be possible to operate with the IT crystal without the use of a heater and oven. However, in the event that it is desired to start operating on frequency, with a very short warm up time, a heater can be provided for holding the temperature of the crystal above 30° and which will be rendered inoperative when the equipment as a whole reaches this temperature. Such a heater will require energy only during the warm up time of the set and therefore consumes much less energy than a heater which must hold the unit at a higher value.

It is therefore seen that there has been provided an improved crystal cut which provides a crystal blank having very desirable temperature characteristics. This crystal cut requires very small rotation with respect to an atomic plane, actually the inclination of the cut with respect to the X axis is the same as that of the atomic plane, and the inclination with respect to the Z direction differs by less than 4° from that of the atomic plane. Therefore, the identification of the cut on the natural crystal may be easily accomplished.

As previously stated the crystal activity is sufficiently good for controlling radio frequency oscillators and the activity is substantially constant throughout the operating frequency range. Further, the thickness shear mode vibration which is utilized has a greater piezoelectric coefficient than the other two thickness modes of vibration, and the coupling therebetween is relatively small so that these other modes do not interfere seriously with the vibration of the crystal at the desired mode. Coupling with undesired harmonics of low frequency modes is also reduced.

While values have been given for identifying a single cut which has been found to provide good results, it is recognized that deviations from these values may give satisfactory results for certain applications. Further, it may be possible to find crystal cuts having substantially zero temperature coefficient which are closely positioned with respect to other atomic planes and may thereby be easily identified. The invention therefore is not to be limited by the specific values stated but only to the extent defined in the appended claims.

We claim:

1. A piezoelectric vibratory body for high frequency use and having substantially zero frequency-temperature coefficient in the range from 30° to 110° C. when operating in thickness shear mode vibration, said body being a plate cut from a quartz crystal with the normal to the major faces thereof extending at an angle of approximately 55° 43′ from the "Z" axis of the crystal, and with the projection of the normal on the XY plane extending at an angle of approximately 70° 54′ from an "X" axis of the crystal.

2. A crystal blank cut from a quartz crystal having an optical "Z" direction and at least one electrical "X" axis extending at right angles to said optical direction, said crystal blank being adapted to vibrate in thickness shear mode, said blank being round with contoured major faces, with the normal to the plane thereof extending at an angle within the range from 55° 40′ to 55° 50′ with respect to the "Z" direction, and with the projection of the normal on the XY plane of the crystal extending at an angle of the order of 70° 54′ with respect to said "X" axis.

3. A piezoelectric quartz crystal vibrating plate for high frequency use and having substantially zero frequency-temperature characteristics over a wide temperature range extending above 100° C. when operating in thickness shear mode crystal vibration, said crystal plate being cut from a mother crystal of the trigonal type having an optical "Z" direction and three "X" axes extending at angles of 120° with respect to each other and at right angles to the "Z" direction, said crystal plate being cut from the crystal along a plane rotated through an angle of approximately 19° and 6′ from an X axis of the crystal, and with the plane also being rotated through an angle of approximately 34° and 17′ from the "Z" direction.

4. A piezoelectric quartz crystal vibrating plate for high frequency use and having substantially zero frequency-temperature characteristics over a wide temperature range extending above 100° C. when operating in thickness shear mode crystal vibration, said crystal plate being cut from a mother crystal of the trigonal type having an optical "Z" direction and three "X" axes extending at angles of 120° with respect to each other and at right angles to the "Z" direction, said crystal plate being cut from the crystal along a plane rotated through an angle of approximately 19° and 6′ from an X axis of the crystal and with the plane thereof being then rotated through an angle in the range from 34° 0′ to 34° 30′ from the "Z" direction.

5. A piezoelectric quartz crystal vibratory plate for high frequency use and having substantially zero frequency-temperature coefficient over a wide range extending above 100° C. when operating in thickness shear mode vibration, said crystal plate being cut from a quartz crystal having an optical "Z" direction and at least one electrical "X" axis extending at right angles to said optical direction, and with an atomic plane extending through said crystal having the normal thereto inclined to an angle of approximately 59° 14′ with respect to the "Z" direction and with the projection of the normal on an XY plane of the crystal being inclined at an angle of approximately 70° 54′ with respect to the "X" axis, said crystal plate being cut from the crystal along a plane thereof having the normal thereto inclined at an angle of approximately 55° 43′ with respect to said "Z" direction, and having the projection of the normal on the XY plane of the crystal being inclined with respect to the "X" axis at substantially the same angle as said atomic plane.

6. A piezoelectric quartz crystal vibratory plate for high frequency use and having substantially zero frequency-temperature coefficient over a wide range extending above 100° C. when operating in thickness shear mode vibration, said crystal plate being cut from a quartz crystal having an optical "Z" direction and at least one electrical "X" axis extending at right angles to said optical direction, and with an atomic plane extending through said crystal having the normal thereto inclined to an angle of approximately 59° 14′ with respect to the "Z" direction and with the projection of the normal on an XY plane of the crystal being inclined at an angle of approximately 70° 54′ with respect to the "X" axis, said crystal plate being cut from the crystal along a plane thereof having the normal thereto inclined with respect to the "Z" direction at an angle within the range from substantially 55° 40′ to 55° 50′, and having the projection of the normal on the XY plane of the crystal being inclined with respect to the "X" axis at substantially the same angle as said atomic plane.

References Cited in the file of this patent

UNITED STATES PATENTS

| | | |
|---|---|---|
| 2,111,383 | Bokovoy | Mar. 15, 1938 |
| 2,111,384 | Bokovoy | Mar. 15, 1938 |
| 2,254,866 | Baldwin | Sept. 2, 1941 |
| 2,277,245 | Mason | Mar. 24, 1942 |

FOREIGN PATENTS

| | | |
|---|---|---|
| 436,407 | Great Britain | Oct. 10, 1935 |